(12) United States Patent
Lee et al.

(10) Patent No.: US 9,893,562 B2
(45) Date of Patent: Feb. 13, 2018

(54) DIRECT CURRENT UNINTERRUPTIBLE POWER SUPPLY SYSTEM

(71) Applicants: Jae Jin Lee, Chungcheongbuk-do (KR); Kyo Beum Lee, Gyeonggi-do (KR)

(72) Inventors: Jae Jin Lee, Chungcheongbuk-do (KR); Kyo Beum Lee, Gyeonggi-do (KR)

(73) Assignee: Jae Jin Lee, Chungcheongbuk-do (KR)

( * ) Notice: Subject to any disclaimer, the term of this patent is extended or adjusted under 35 U.S.C. 154(b) by 266 days.

(21) Appl. No.: 14/949,100

(22) Filed: Nov. 23, 2015

(65) Prior Publication Data

US 2017/0149273 A1    May 25, 2017

(51) Int. Cl.
*H02J 9/06*       (2006.01)
*H05B 37/00*    (2006.01)
*H02J 7/00*       (2006.01)

(52) U.S. Cl.
CPC .............. *H02J 9/061* (2013.01); *H05B 37/00* (2013.01); *H02J 7/0029* (2013.01); *H02J 2007/004* (2013.01)

(58) Field of Classification Search
CPC ...................................................... H02J 9/061
See application file for complete search history.

(56) References Cited

U.S. PATENT DOCUMENTS

| | | | | |
|---|---|---|---|---|
| 5,579,197 A * | 11/1996 | Mengelt | ................... | H02J 9/062 307/66 |
| 5,635,773 A * | 6/1997 | Stuart | ..................... | H02J 9/062 307/66 |
| 7,206,944 B2 * | 4/2007 | Odaohhara | ............. | G06F 1/263 713/300 |
| 7,446,433 B2 * | 11/2008 | Masciarelli | ............. | H02J 9/062 307/66 |
| 8,937,406 B2 * | 1/2015 | Wang | ........................ | H02J 9/06 307/66 |
| 9,685,821 B2 * | 6/2017 | Lee | .......................... | H02J 9/061 |
| 9,716,408 B2 * | 7/2017 | Kim | ........................ | H02J 9/061 |
| 2016/0094086 A1 * | 3/2016 | Lee | .......................... | H02J 9/061 307/20 |
| 2016/0329830 A1 * | 11/2016 | Hussain | ................ | H02M 7/537 |

FOREIGN PATENT DOCUMENTS

| | | | | |
|---|---|---|---|---|
| JP | 2007-0267501 | 10/2007 | ................ | H02J 9/06 |
| JP | 2008-186726 | 8/2008 | ............. | H01M 8/04 |
| JP | 2013-074724 | 4/2013 | ............ | H02M 3/155 |
| KR | 10-0778892 | 11/2007 | ................ | H02J 9/06 |
| KR | 10-1322617 | 10/2013 | ................ | H02J 9/06 |

* cited by examiner

*Primary Examiner* — Thomas J Hiltunen
(74) *Attorney, Agent, or Firm* — Harness, Dickey & Pierce, P.L.C.

(57) ABSTRACT

Disclosed herein is a direct current (DC) uninterruptible power supply system. The DC uninterruptible power supply system is connected to a DC power conversion system converting prevailing alternating current (AC) power into DC power, supplies the DC power to a load, charges an internal auxiliary power supply device with the DC power, and continuously supplies power to the load from the auxiliary power supply device while cutting off an electric connection with the DC power conversion system when the DC power conversion system short-circuits due to a leakage current or damage thereof or is disconnected.

15 Claims, 3 Drawing Sheets

DIRECT CURRENT UNINTERRUPTIBLE POWER SUPPLY SYSTEM

FIELD

The present invention relates to a direct current (DC) uninterruptible power supply system, and more particularly, to a DC uninterruptible power supply system which is connected to a DC power conversion system converting prevailing alternating current (AC) power into DC power, supplies the DC power to a load, charges an internal auxiliary power supply device with the DC power, and continuously supplies power to the load from the auxiliary power supply device while cutting off an electric connection with the DC power conversion system when the DC power conversion system short-circuits due to a leakage current or damage thereof or is disconnected.

BACKGROUND

Uninterruptible power supply systems are apparatuses which generally provide power generated by a battery or an additional auxiliary power supply device to a load in case of emergency such as a power failure. Since an uninterruptible power supply system is allowed to operate in the event of a power outage and an auxiliary power supply device supplies power for several seconds to several hours, electric installations of a load are protected and electric installations are allowed to normally operate.

Such uninterruptible power supply system includes a central processing unit (CPU) which controls operations of converting prevailing alternating current (AC) power into direct current (DC) power to charge an auxiliary power supply device such as a battery, converting DC power of the auxiliary power supply device into AC power to be supplied to a load in the event of an electric discharge, and converting the DC power of the auxiliary power supply device into AC power when a power outage is sensed.

However, the CPU may malfunction due to electromagnetic waves and may wrongly determine as a power outage occurs when it does not occur due to a failure in hardware of the CPU or an error or disorder in software such as an error in a control program of the CPU. Accordingly, the CPU allows DC power of an auxiliary power supply device to be converted into AC power, thereby generating a discharge of the auxiliary power supply device even though a power outage does not occur.

Also, after a power outage actually occurs, since the DC power of the auxiliary power supply device is not converted into AC power before the CPU determines the occurrence of the power outage and begins controlling a conversion operation of the power of the auxiliary power supply device. Accordingly, for example, when the load is one of a network server, a hub forming a local area network (LAN), an L2 switch, an access point, etc. it is impossible to normally perform network communication. Also, when the load is a closed-circuit television (CCTV) camera forming a security system, since security surveillance is not normally performed, unexpected damages may occur to users.

Also, a configuration of a circuit for converting prevailing AC power into DC power to charge the auxiliary power supply device and converting DC power of the auxiliary power supply device into AC power to supply DC power again to the load becomes complicated.

CITED DOCUMENT

Patent Document

Korean Patent Registration No. 10-0778892 (registered in Nov. 16, 2007).

SUMMARY

Therefore, it is an aspect of the present invention to provide a direct current (DC) uninterruptible power supply system which is connected to a DC power conversion system converting prevailing alternating current (AC) power into DC power, supplies the DC power to a load, charges an internal auxiliary power supply device with the DC power, and continuously supplies power to the load from the auxiliary power supply device while cutting off an electric connection with the DC power conversion system when the DC power conversion system short-circuits or is disconnected due to a leakage current or damage thereof.

It is another aspect of the present invention to provide a DC uninterruptible power supply system which allows power conversion and power supply to be performed without control of a central processing unit (CPU).

Aspects of the present invention are not limited thereto and additional aspects of the invention will be obvious to one of ordinary skill in the art from the following description.

In accordance with one aspect of the present invention, a DC uninterruptible power supply system provided with a first connection unit electrically connected to a DC power conversion system which converts prevailing AC power into DC power, an auxiliary power supply device charged with the DC power, and a second connection unit which is electrically connected to a load and supplies the DC power or power output from the auxiliary power supply device to the load includes a charging portion which boosts a level of DC voltage power supplied from the DC power conversion system normally connected to the first connection unit and charges the auxiliary power supply device with the boosted DC voltage power, a discharge portion which generates internal voltage power by stepping down a level of voltage power of the auxiliary power supply device, a current sensor which outputs sensor voltages at different levels depending on whether current power is applied from the discharge portion, a first comparator which compares the levels of the sensor voltages output from the current sensor with a level of a first reference voltage and outputs a first clear voltage or a first set voltage according to a result thereof, a second comparator which compares the level of the DC voltage power supplied from the DC power conversion system with a level of a second reference voltage and outputs a second clear voltage or a second set voltage according to a result thereof, and a switchover portion which includes a relay connected to the first connection unit, the second connection unit, and the discharge portion, in which as the first clear voltage and the second clear voltage are output at the same time from the first comparator and the second comparator while the load is connected to the second connection unit, the relay is controlled to be a clear state to allow the DC power supplied from the DC power conversion system to be supplied to the load of the second connection unit and to the auxiliary power supply device through the charging portion and as the first set voltage and the second set voltage are output at the same time from the first comparator and the second comparator, the relay is controlled to be a set state to allow the internal voltage power generated at the discharge portion to be supplied to the second connection unit.

A case in which the first clear voltage and the second clear voltage are output at the same time from the first comparator and the second comparator while the load is connected to the second connection unit may occur when the DC power conversion system is normally connected to the first connection unit in such a way that the DC power supplied from the DC power conversion system is supplied to the load connected to the second connection unit and used to charge the auxiliary power supply device at the same time.

A case in which the first set voltage and the second set voltage are output at the same time from the first comparator and the second comparator while the load is connected to the second connection unit may occur when a disconnection state of the DC power conversion system from the first connection unit, a damage state of the DC power conversion system connected to the first connection unit, or a short circuit state of the DC power conversion system occurs.

The switchover portion, as the first clear voltage is output from the first comparator and simultaneously the second set voltage is output from the second comparator in a no-load state in which the load is not connected to the second connection unit, may control the relay to be the clear state to prevent power of the auxiliary power supply device from being discharged.

A case in which the first clear voltage is output from the first comparator and simultaneously the second set voltage is output from the second comparator in a no-load state in which the load is not connected to the second connection unit may occur when the DC power conversion system is damaged while being connected to the first connection unit.

The disconnection state of the DC power conversion system from the first connection unit may be a state in which the DC power conversion system is disconnected from the first connection unit and the DC power normally output from the DC power conversion system is not supplied to the first connection unit.

The damage state of the DC power conversion system may be a state in which the DC power conversion system does not work and the DC power is not normally output.

The short-circuit state of the DC power conversion system may be a state in which an anode and a cathode of the DC power conversion system short-circuit.

The current sensor may output a first sensor voltage when the current power is applied from the discharge portion and may output a second sensor voltage at a level higher than that of the first sensor voltage when the current power is not applied from the discharge portion. Also, the first comparator may compare the first sensor voltage with the first reference voltage at the level higher than that of the first sensor voltage to output the first set voltage and may compare the second sensor voltage with the first reference voltage at the level lower than that of the second sensor voltage to output the first clear voltage.

The second comparator may output the second clear voltage when the level of the DC voltage power supplied from the DC power conversion system is higher than that of the second reference voltage and may output the second set voltage when the level of the DC voltage power supplied from the DC power conversion system is lower than that of the second reference voltage.

The current sensor, as the current power is applied from the discharge portion, may output the internal voltage power generated at the discharge portion as sense voltage power. Here, the DC uninterruptible power supply system may further include a down voltage generation portion which generates down voltage power by stepping down a level of the sense voltage power output from the current sensor and applies the down voltage power to the second connection unit. Also, the down voltage power may be supplied to the second connection unit until the switchover portion receives the first set voltage and the second set voltage from the first comparator and the second comparator at the same time in such a way that the state of the relay is completely switched over from the clear state into the set state.

The DC uninterruptible power supply system may further include an auxiliary power supply portion which stabilizes the voltage power of the auxiliary power supply device to be uniform control power and supplies the control power to the first comparator, the second comparator, and the relay.

The DC uninterruptible power supply system may further include a switch which is connected to the auxiliary power supply device and controls connection between the discharge portion and the auxiliary power supply device.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, exemplary embodiments of the present invention will be described in detail with reference to the attached drawings.

The embodiments of the present invention are provided to more completely explain the present invention to one of ordinary skill in the art. The following embodiments may be changed into various other forms, and the scope of the present invention will not be limited thereto. The embodiments are provided to allow the present disclosure to be more complete and to fully transfer the concept of the present invention to one of ordinary skill in the art.

The terms are used herein to describe particular embodiments but should not limit the present invention. As used herein, singular expressions, unless defined otherwise in contexts, include plural expressions. It will be further understood that the terms "comprises" and/or "comprising" used herein specify the presence of stated shapes, numbers, operations, members, elements, and/or groups thereof, but do not preclude the presence or addition of one or more other shapes, numbers, operations, members, elements, and/or groups thereof. As used herein, the term "and/or" includes any and all combinations of one or more of the associated listed items.

It will be understood that although the terms "first", "second", etc. may be used herein to describe various members, components, areas, layers, and/or portions, these members, components, areas, layers and/or portions should not be limited by these terms. The terms do not mean a particular order, top and bottom, or merits and demerits but are only used to distinguish one member, area, or portion from others. Accordingly, a first member, area, or portion which will be described below may indicate a second member, area, or portion without deviating from teachings of the present invention.

Hereinafter, the embodiments of the present invention will be described with reference to schematic drawings thereof. Throughout the drawings, for example, according to manufacturing technologies and/or tolerances, modifications of illustrated shapes may be perceived. Accordingly, the embodiments of the present invention will not be understood to be being limited to certain shapes of illustrated areas but will include changes in shape which occur while being manufactured.

Figure 1:
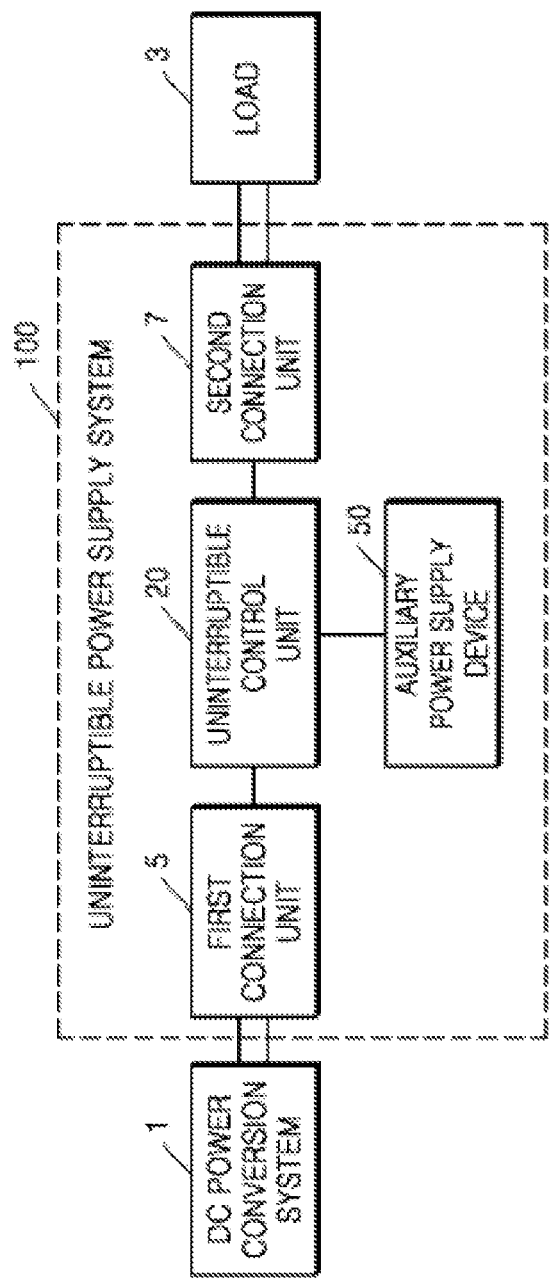
FIG. 1 is a configuration diagram of a direct current (DC) uninterruptible power supply system according to an embodiment of the present invention.
Figure 2:
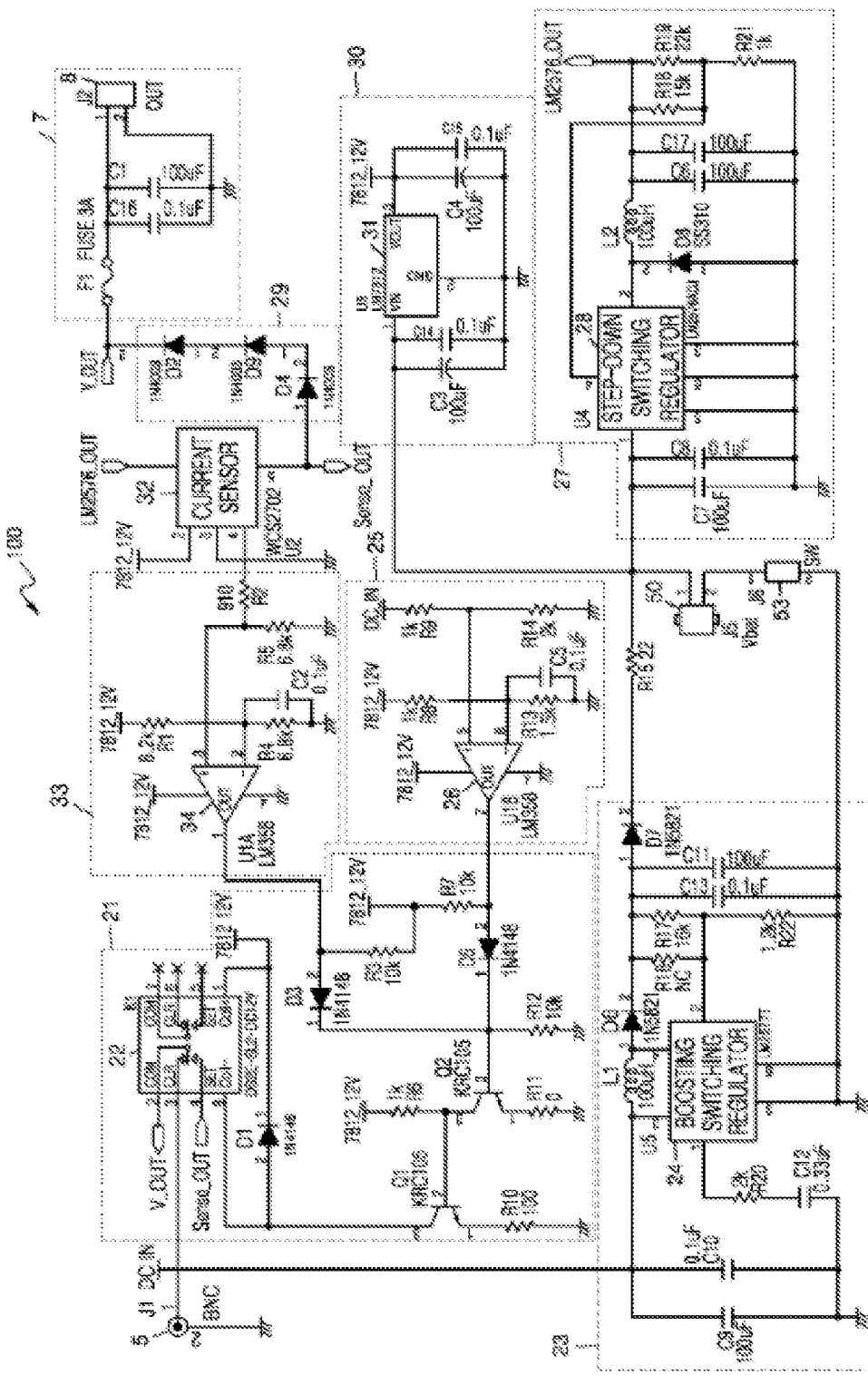
FIG. 2 is a circuit diagram illustrating an example of an actually applied circuit of the DC uninterruptible power supply system of FIG. 1.

FIG. 1 is a configuration view of a direct current (DC) uninterruptible power supply system according to an embodiment of the present invention. FIG. 2 is a view illustrating an example of an actually applied circuit of the DC uninterruptible power supply system of FIG. 1.

Referring to FIGS. 1 and 2, an uninterruptible DC power supply system 100 according to the embodiment of the present invention includes a first connection unit 5, a second connection unit 7, an uninterruptible control unit 20, and an auxiliary power supply device 50.

The first connection unit 5 is electrically connected to a DC power conversion system 1 which converts prevailing alternating current (AC) power into DC power. Herein, the DC power conversion system 1 may be an adapter which includes a plug, converts prevailing AC power into DC power, and supplies the DC power to the first connection unit 5 through the plug. Hereupon, the first connection unit 5 may be a plug socket into which the plug of the adapter is inserted. It will be understood that the term power used herein has a concept including current power and voltage power. For example, DC power output from the DC power conversion system 1 includes DC current power and DC voltage power.

The auxiliary power supply device 50 is charged with the DC power supplied from the DC power conversion system 1.

The second connection unit 7 is electrically connected to a load 3 and supplies DC power supplied from the DC power conversion system 1 or the auxiliary power supply device 50 to the load 3. Herein, the load 3 may be a device which includes a plug and consumes the DC power supplied from the DC power conversion system 1 or the auxiliary power supply device 50, such as a closed-circuit television (CCTV) camera, a hub, an L2 switch, and an access point. Accordingly, the second connection unit 7 includes a plug socket into which the plug of the load 3 is inserted and may further include a fuse F1 and capacitors C1 and C16.

The uninterruptible control unit 20 controls to supply the DC power supplied from the DC power conversion system 1 normally connected to the first connection unit 5 to the load 3 through the second connection unit 7, to charge the auxiliary power supply device 50, and to continuously supply power to the load 3 while completely cut off an electric connection between the DC power conversion system 1 and the auxiliary power supply device 50 when the DC power conversion system 1 is disconnected from the first connection unit 5, is damaged, or short-circuits.

Herein, a case in which the DC power conversion system 1 is normally connected to the first connection unit 5 indicates a state in which the DC power normally output from the DC power conversion system 1 is supplied to the second connection portion 7 and the auxiliary power supply device 50 through the first connection unit 5.

Also, a disconnection state of the DC power conversion system 1 from the first connection unit 5 indicates a state in which the DC power conversion system 1 is disconnected from the first connection unit 5 and the DC power normally output from the DC power conversion system 1 is not supplied to the first connection unit 5.

Also, a damage state of the DC power conversion system 1 indicates a state in which the DC power conversion system 1 does not work and the DC power is not normally output.

Also, a short-circuit state of the DC power conversion system 1 indicates a state in which an anode and a cathode of the DC power conversion system 1 short-circuit.

The uninterruptible control unit 20, referring to FIG. 2, includes a switchover portion 21, a charging portion 23, a discharge portion 27, a current sensor 32, a first comparator 33, and a second comparator 25.

The charging portion 23 boosts a level of DC voltage power supplied from the DC power conversion system 1 normally connected to the first connection unit 5 and charges the auxiliary power supply device 50 with the boosted DC voltage power. The charging portion 23 includes capacitors C9, C10, C11, C12, and C13, an inductor L1, resistors R16, R17, R20, and R22, diodes D6 and D7, and a boosting switching regulator 24. When the level of the DC voltage power supplied from the DC power conversion system 1 is, for example, 12 V, the DC voltage power of 12 V is boosted to output a voltage capable of fully charging the auxiliary power supply device 50.

One end of the capacitor C9 is electrically connected to a first terminal of the first connection unit 5, a third terminal of the relay 22, and the capacitor 10 and another end thereof is electrically connected to a ground.

One end of the capacitor C10 is electrically connected to the one end of the capacitor C9, a fifth terminal of the boosting switching regulator 24, and the inductor L1 and another end thereof is electrically connected to the capacitor C12 and a ground.

One end of the resistor R20 is electrically connected to a first terminal of the boosting switching regulator 24 and another end thereof is electrically connected to the capacitor C12.

One end of the capacitor C12 is electrically connected to the other end of the resistor R20 and another end thereof is electrically connected to the ground.

One end of the inductor L1 is electrically connected to the fifth terminal of the boosting switching regulator 24, the one end of the capacitor C10, the one end of the capacitor C9, the first terminal of the first connection unit 5, and the third terminal of the relay 22 and another end thereof is electrically connected to a fourth terminal of the boosting switching regulator 24 and the diode D6.

One end of the diode D6 is electrically connected to the other end of the inductor L1 and the fourth terminal of the boosting switching regulator 24 and another end thereof is electrically connected to the resistor R16, the resistor R17, the capacitor C13, the capacitor C11, and the diode D7.

One end of the resistor R16 is electrically connected to the other end of the diode D6, one end of the resistor R17, the capacitor C13, the capacitor C11, and the diode D7 and another end thereof is electrically connected to a second terminal of the boosting switching regulator 24, another end of the resistor R17, and one end of the resistor R22.

One end of the resistor R17 is electrically connected to the other end of the diode D6, the one end of the resistor R16, the capacitor C13, the capacitor C11, and the diode D7 and the other end thereof is electrically connected to the resistor R22, the other end of the resistor R16, and the second terminal of the boosting switching regulator 24.

The one end of the resistor R22 is electrically connected to the other end of the resistor R16, the second terminal of the boosting switching regulator 24, and the other end of the resistor R17 and another end thereof is electrically connected to a ground.

One end of the capacitor C13 is electrically connected to the other end of the diode D6, the one end of the resistor R16, the one end of the resistor R17, one end of the capacitor C11, and the diode D7 and another end thereof is electrically connected to another end of the capacitor C11 and the ground.

The one end of the capacitor C11 is electrically connected to the other end of the diode D6, the one end of the resistor R16, the one end of the resistor R17, the one end of the capacitor C13, and the diode D7 and the other end thereof is electrically connected to the other end of the capacitor C13 and the ground.

One end of the diode D7 is electrically connected to the other end of the diode D6, the one end of the resistor R16, the one end of the resistor R17, the one end of the capacitor C13, and the one end of the capacitor C11 and another end thereof is electrically connected to the resistor R15.

A third terminal and a sixth terminal of the boosting switching regulator 24 are electrically connected to the ground.

The boosting switching regulator 24 is embodied using LM2577T of National Semiconductor but is not limited thereto.

Due to switching according to the oscillation of the inductor L1, the capacitor C12, and the diode D6, the boosting switching regulator 24 increases and applies voltage to a schottky diode D7. Using a voltage of about 16.8 V boosted through the schottky diode D7, the auxiliary power supply device 50 is charged to a full charge voltage of the auxiliary power supply device 50, for example, about 16.8 V when the auxiliary power supply device 50 is formed of four lithium-ion batteries with a fully charged voltage of 4.2 V and a discharge reference voltage of 3.4 V.

Meanwhile, the resistor R15 limits a completely discharged state of the auxiliary power supply device 50 by limiting a current. For example, when the four lithium ion batteries are included, the resistor R15 prevents a current of maximum 100 mA or more from flowing from the auxiliary power supply device 50 into the charging portion 23 at 13.6 V.

The charging portion 27 generates internal voltage power by stepping down a level of voltage power of the auxiliary power supply device 50. The internal voltage power generated as described above may be supplied to the second connection unit 7 through the switchover portion 21 which will be described below or may be stepped down through a down voltage generation portion 29 and supplied to the second connection unit 7.

The discharge portion 27 includes capacitors C6, C7, C8, and C17, a step-down switching regulator 28, a diode D8, an inductor L2, and resistors R18, R19, and R21. Connections among them are as below. The discharge portion 27 may be configured to step down a level of the power of the auxiliary power supply device 50, which is 16.8 V, and outputs 12.3 V but is not limited thereto.

One end of the capacitor C7 is electrically connected to a first terminal of the auxiliary power supply device 50 and a first terminal of the step-down switching regulator 28 and another end thereof is electrically connected to a ground.

One end of the capacitor C8 is electrically connected to the resistor 15, the first terminal of the auxiliary power supply device 50, the one end of the capacitor C7, and the first terminal of the step-down switching regulator 28 and another end thereof is electrically connected to the ground.

One end of the diode D8 is electrically connected to the ground and another end thereof is electrically connected to a second terminal of the step-down switching regulator and the inductor L2.

One end of the inductor L2 is electrically connected to the second terminal of the step-down switching regulator 28 and the other end of the diode D8 and another end thereof is electrically connected to the capacitor C6, the capacitor C17, the resistor 18, and the resistor R19.

One end of the capacitor C6 is electrically connected to the other end of the inductor L2, the capacitor C17, the resistor 18, and the resistor R19 and another end thereof is electrically connected to the ground.

One end of the capacitor C17 is electrically connected to the other end of the inductor L2, the one end of the capacitor C6, the resistor 18, and the resistor R19 and another end thereof is electrically connected to the ground.

One end of the resistor R18 is electrically connected to the other end of the inductor L2, the one end of the capacitor C6, the one end of the capacitor C17, one end of the resistor R19 and another end thereof is electrically connected to another end of the resistor R19, the resistor R21, and a fourth terminal of the step-down switching regulator 28.

The one end of the resistor R19 is electrically connected to the one end of the resistor R18, the one end of the capacitor C17, the one end of the capacitor C6, a fourth terminal of the relay 22 of the switchover portion 21 which will be described below, and the down voltage generation portion 29 which will be described below and the other end thereof is electrically connected to the resistor R21.

One end of the resistor R21 is electrically connected to the other end of the resistor R19 and another end thereof is electrically connected to the ground.

A third terminal, a fifth terminal, and a sixth terminal of the step-down switching regulator 28 are electrically connected to the ground.

The step-down switching regulator 28 is embodied using LM2576ADJ of National Semiconductor but is not limited thereto.

An output voltage of the step-down switching regulator 28 steps down voltage power of the auxiliary power supply device 50 through switching of the inductor L2 and the diode D8. An input voltage input to the first terminal of the step-down switching regulator 28 is a voltage of the auxiliary power supply device 50 and may vary, for example, from about 13.6 V to about 16.8 V. In an ideal situation, when it is assumed that the step-down switching regulator 28 uniformly maintains the output voltage without a change caused by variations of the input voltage, an output voltage of the discharge portion 27 may be determined to be about 12.3 V.

The current sensor 32 outputs sensor voltages at mutually different levels depending on whether current power is applied from the discharge portion 27 and outputs internal voltage power LM2576-OUT generated by the discharge portion 27 as the current power is applied from the discharge portion 27 as the sense voltage power Sense_OUT to supply the sense voltage power Sense_OUT to the second connection unit 7 through the down voltage generation portion 29 which will be described below. In the current sensor 32 described above, the current power applied from the discharge portion 27 to a first terminal is output from a fifth terminal, control power 7812_12V output from an auxiliary power supply portion 30 which will be described below is applied to a second terminal, a third terminal is electrically connected to a ground, and an operation of outputting the sensor voltages at mutually different levels depending on whether the current power is applied from the discharge portion 27 to the first terminal through a fourth terminal. Also, the current sensor 32 may be formed of a hall sensor. Here, the current sensor 32 outputs a first sensor voltage when the current power is applied from the discharge portion 27 and outputs a second sensor voltage at a level higher than that of the first sensor voltage when the current power is not applied. For example, in a state in which the control power of about 12 V output from the auxiliary power supply portion 30 is applied to the current sensor 32, when the current power applied from the discharge portion 27 is input to the first terminal of the current sensor 32 and passes through the down voltage generation portion 29 to allow a current of 100 mA or more to flow out to the fifth terminal, the first sensor voltage of about 6.2 V may be output from the fourth terminal of the current sensor 32. When there is no current flowing through the down voltage generation portion 29, the second sensor voltage from about 6.3 V to about 6.7 V may be output from the fourth terminal of the current sensor 32.

The first comparator 33 compares the levels of the sensor voltages output from the current sensor 32 with a level of a first reference voltage and outputs a first clear voltage or a first set voltage according to a result thereof. That is, the first comparator 33 compares the first sensor voltage with the first reference voltage at a level higher than that of the first sensor voltage to output the first set voltage and compares the second sensor voltage with the first reference voltage at the level lower than that of the second sensor voltage to output the first clear voltage.

The comparator 33 described above may be formed of a combination of an operational amplifier OP-AMP 34 and resistors R1, R2, R4, and R5 and a capacitor C2. A voltage obtained by dividing the first sensor voltage or the second sensor voltage output from the current sensor 32 through the resistors R2 and R5 is applied to a non-inverting terminal of the operational amplifier 34. Meanwhile, the first reference voltage that is a voltage obtained by dividing the control power output from the auxiliary power supply portion 30 through the resistors R1 and R4 is applied to an inverting terminal of the operational amplifier 34. Here, the first reference voltage may be higher than the first sensor voltage and may be smaller than the second sensor voltage. Accordingly, when the first sensor voltage is applied from the current sensor 32 to the first comparator 33, the first comparator 33 outputs the first set voltage. When the second sensor voltage is applied from the current sensor 32 to the first comparator 33, the first comparator 33 outputs the first clear voltage.

The second comparator 25 compares a level of DC voltage power supplied from the DC power conversion system 1 with a level of a second reference voltage and outputs a second clear voltage or a second set voltage according to a result thereof.

The second comparator 25 described above is formed of a combination of an operational amplifier OP-AMP 26 and resistors R8, R9, R13, and R14.

A non-inverting terminal of the operational amplifier 26 is electrically connected to a connection node between the resistor R9 and the resistor R14. Here, a level of power applied to the non-inverting terminal is identical to that of a voltage obtained by dividing DC voltage power DC_IN supplied from the DC power conversion system 1 by the resistor R9 and the resistor R14. One end of the resistor R9 is electrically connected to the first terminal of the first connection portion 5 and another end thereof is electrically connected to the resistor R14. One end of the resistor R14 is electrically connected to the other end of the resistor R9 and another end thereof is electrically connected to a ground.

Meanwhile, an inverting terminal of the operation-amplifier 26 is electrically connected to the resistor R8, the resistor R13, and a capacitor C5 and receives a voltage obtained by dividing control power with a constant voltage level output from an auxiliary power supply portion 30, which will be described below, by the resistor R8, the resistor R13, and the capacitor C5, that is, the second reference voltage. One end of the resistor R8 is electrically connected to the auxiliary power supply portion 30 and another end thereof is electrically connected to the resistor R13, the inverting terminal of the operational amplifier 26, and the capacitor C5. One end of the resistor R13 is electrically connected to the inverting terminal of the operational amplifier 26, the other end of the resistor R8, and the capacitor C5 and another end thereof is electrically connected to a ground. One end of the capacitor C5 is electrically connected to the other end of the resistor R8, the inverting terminal of the operational amplifier 26, and the one end of the resistor R13 and another end thereof is electrically connected to the ground.

As described above, the operational amplifier 26 receives the voltage obtained by dividing the DC voltage power DC_IN supplied from the DC power conversion system 1 at the non-inverting terminal and receives the second reference voltage at the inverting terminal to compare levels thereof and to output the second clear voltage or the second set voltage according to a result thereof. Here, the second clear voltage may be output when the voltage obtained by dividing the DC voltage power DC_IN by the resistors R9 and R14 is greater than the second reference voltage and the second set voltage may be output when the voltage obtained by dividing the DC voltage power DC_IN by the resistors R9 and R14 is smaller than the second reference voltage. The second clear voltage may be higher than the second set voltage.

The switchover portion 21 includes the relay 22 connected to the first connection unit 5, the second connection unit 7, and the discharge portion 27. When the load 3 is connected to the second connection unit 7, as the first clear voltage and the second clear voltage are output from the first comparator 33 and the second comparator 25 at the same time, the relay 22 is controlled to be a clear state to supply the DC power supplied from the DC power conversion system 1 to the load 3 connected to the second connection unit 7, and simultaneously, to the auxiliary power supply device 50 through the charging portion 23. Also, as the first set voltage and the second set voltage are output from the first comparator 33 and the second comparator 25 at the same time, the relay 22 is controlled to be a set state to supply the internal voltage power generated by the discharge portion 27 to the second connection unit 7. Here, when the relay 22 is in the set state, the fourth terminal and a second terminal of the relay 22 are electrically connected. Also, the fourth terminal of the relay 22 is a terminal electrically connected to the fifth terminal of the current sensor 32 and the sense voltage power Sense_OUT is applied thereto and the second terminal is a terminal electrically connected to the second connection unit 7. Meanwhile, in the clear state of the relay 22, a third terminal of the relay 22 and the second terminal of the relay 22 are electrically connected.

Here, the third terminal of the relay 22 is electrically connected to the first terminal of the first connection unit 5 and receives the DC voltage power DC_IN supplied from the DC power conversion system 1.

The relay 22 includes a coil (coil+ and coil−) which connect the first terminal and an eighth terminal, respectively. A current flows through the coil when the first set voltage and the second set voltage output at the same time from the first comparator 33 and the second comparator 25 are applied while passing through a circuit consisting of the resistors R3, R7, R12, R11, R6, and R10, the diodes D3, D5, and D1, and transistors Q2 and Q1, thereby allowing the second terminal and the fourth terminal of the relay 22 to be electrically connected. Meanwhile, when the first clear voltage and the second clear voltage output at the same time from the first comparator 33 and the second comparator 25 are applied while passing through the circuit consisting of the resistors R3, R7, R12, R11, R6, and R10, the diodes D3, D5 and D1, and the transistors Q2 and Q1, a current flows from the eighth terminal to the first terminal, thereby allowing the second terminal and the third terminal of the relay 22 to be electrically connected.

That is, a switch connected to the second terminal of the relay 22 switches according to a direction of a current which flows through the coil connecting the first terminal with the eighth terminal of the relay 22 to allow the switch to be connected to the third terminal or the fourth terminal of the relay 22. In other words, when the first set voltage and the second set voltage are output at the same time from the first comparator 33 and the second comparator 25, the current which flows through the coil flows in a direction from the first terminal to the eighth terminal in such a way that the switch may switch to allow the second terminal and the fourth terminal of the relay 22 to be connected. When the first clear voltage and the second clear voltage are output at the same time from the first comparator 33 and the second comparator 25, the current which flows through the coil flows in a direction from the eighth terminal to the first terminal in such a way that the switch may switch to allow the second terminal and the third terminal of the relay 22 to be connected.

A fifth terminal, a sixth terminal, and a seventh terminal of the relay 22 are being exposed in the air.

Also, a case in which the first clear voltage and the second clear voltage are output at the same time from the first comparator 33 and the second comparator 25 while the load 3 is connected to the second connection unit 7 may occur when the DC power conversion system 1 is normally connected to the first connection unit 5 in such a way that the DC power supplied from the DC power conversion system 1 is supplied to the load 3 connected to the second connection unit 7 and charges the auxiliary power supply device 50 at the same time.

Also, a case in which the first set voltage and the second set voltage are output at the same time from the first comparator 33 and the second comparator 25 while the load 3 is connected to the second connection unit 7 may occur in a disconnection state of the DC power conversion system 1 from the first connection unit 5, a damage state of the DC power conversion system 1 connected to the first connection unit 5, or a short-circuit state of the DC power conversion system 1.

Here, the disconnection state of the DC power conversion system 1 from the first connection unit 5 indicates a state in which the DC power conversion system 1 is disconnected from the first connection unit 5 and the DC power normally output from the DC power conversion system 1 is not supplied to the first connection unit 5.

Also, the damage state of the DC power conversion system 1 indicates a state in which the DC power conversion system 1 does not work and the DC power is not normally output from the DC power conversion system 1.

Also, the short-circuit state of the DC power conversion system 1 indicates a state in which an anode and a cathode of the DC power conversion system 1 short-circuit.

Meanwhile, as the first clear voltage is output from the first comparator 33 and simultaneously the second set voltage is output from the second comparator 25 in a no-load state in which the load 3 is not connected to the second connection unit 7, the switchover portion 21 may prevent power of the auxiliary power supply device 50 from being discharged by controlling the relay 22 to be a clear state. Here, a case in which the first clear voltage is output from the first comparator 33 and simultaneously the second set voltage is output from the second comparator 25 in the no-load state in which the load 3 is not connected to the second connection unit 7 may occur when the DC power conversion system 1 is damaged while being connected to the first connection unit 5 and the load 3 is not connected to the second connection unit 7.

Meanwhile, as current power is applied from the discharge portion 27, the current sensor 32 may output internal voltage power generated at the discharge portion 27 as sense voltage power. Accordingly, the DC uninterruptible power supply system 100 may further include the down voltage generation portion 29 which generates down voltage power by stepping down a level of the sense voltage power output from the current sensor 32 and applies the down voltage power to the second connection unit 7 and may be configured by connecting three diodes D2, D4, and D9.

The down voltage power may be supplied to the second connection unit 7 until the switchover portion 21 receives the first set voltage and the second set voltage from the first comparator 33 and the second comparator 25 at the same time in such a way that a state of the relay 22 is completely switched over from the clear state to the set state. A reason of including the down voltage generation portion 29 is to generate the down voltage power by stepping down the sense voltage power output from the current sensor 32 to supply the down voltage power to the second connection unit 7 until the switchover portion 21 receives the first set voltage and the second set voltage from the first comparator 33 and the second comparator 25 to completely switch over the state of the relay 22 from the clear state to the set state. Here, a level of the down voltage power may be smaller than the second reference voltage set by the second comparator 25. For example, when the set second reference voltage is 11 V, the down voltage power may be 10.8 V. As described above, it is not to cause the operational amplifier 26 inconvenience in sensing a drop of an input voltage of 11 V or less.

Also, DC uninterruptible power supply system 100 in accordance with the embodiment of the present invention may further include the auxiliary power supply portion 30 which stabilizes the voltage power of the auxiliary power supply device 50 to be uniform control power and supply the control power to the first comparator 33, the second comparator 25 and the relay 22. The control power is supplied as driving power of the operational amplifier 34 in the first comparator 33 and driving power of the operational amplifier 26 in the second comparator 25, is applied to the inverting terminal of the operational amplifier 34 to be used for generating the first reference voltage, is used for generating the second reference voltage applied to the inverting terminal of the operational amplifier 26, and is used to supply a driving current to the coil of the relay 22. A reason of including the auxiliary power supply portion 30 as described above is to remove mutual interference between the charging portion 23 including the boosting switching regulator 24 and the discharge portion 27 including the step-down switching regulator 28 and counter electromotive force of the coil during driving of the relay 22, which act as causes of circuit instability. The auxiliary power supply portion 30 described above may be configured while including capacitors C3, C4, C14, and C15 and a linear regulator 31.

Also, the DC uninterruptible power supply system 100 may further include a switch 53 which is connected to the second terminal of the auxiliary power supply device 50 and controls connection between the discharge portion 27 and the auxiliary power supply device 50. The switch 53 may be one of a push button switch, a toggle switch, and a paddle switch but may be any switch capable of controlling the connection between the discharge portion 27 and the auxiliary power supply device 50. A reason of providing the DC uninterruptible power supply system 100 with the switch 53 is to prevent the auxiliary power supply device 50 from being discharged because basic standby power is consumed by the step-down switching regulator 28 even though the load 3 is not connected to the second connection unit 7.

Operations of the DC uninterruptible power supply system 100 having the configuration shown in FIGS. 1 and 2 will be described with reference to FIG. 3.

Figure 3:
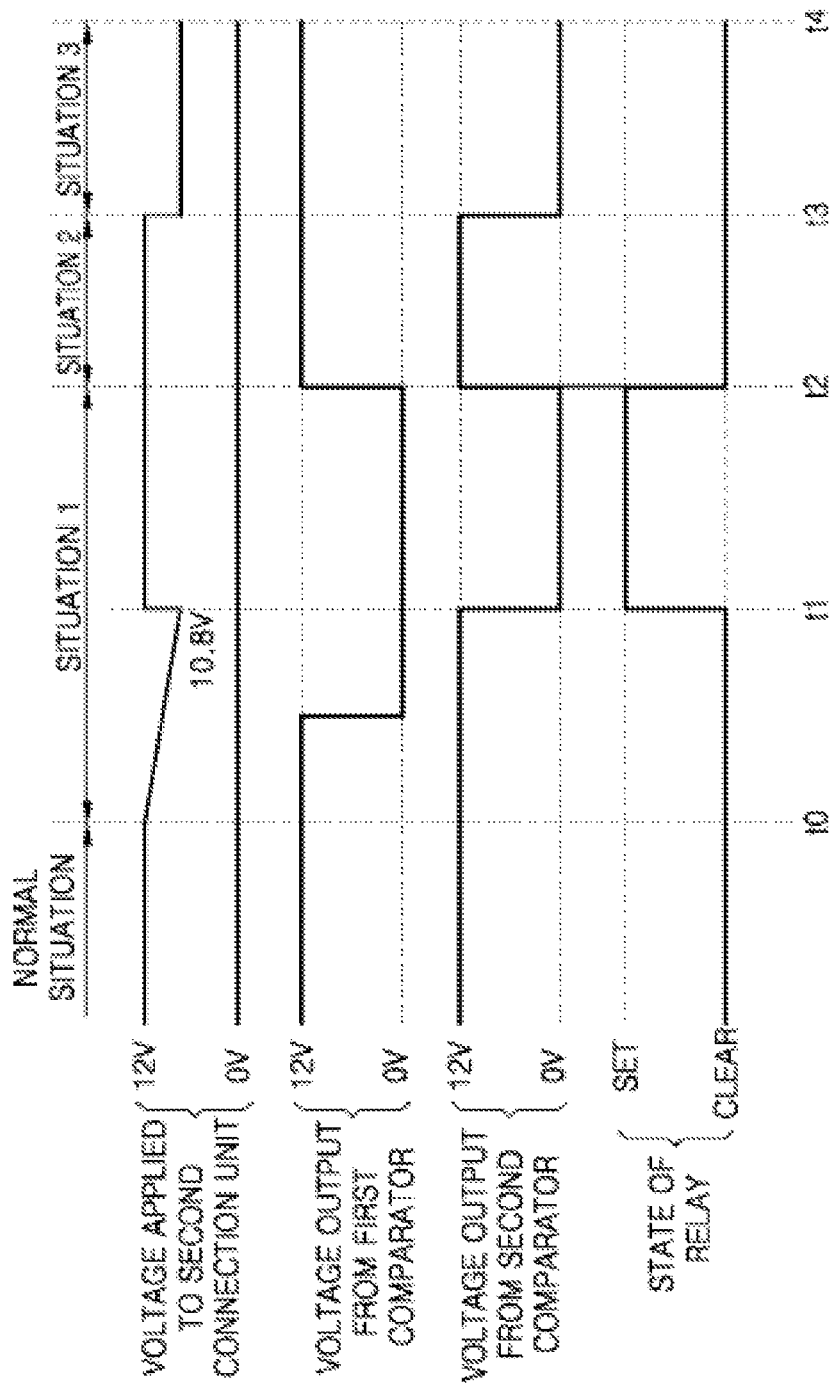
FIG. 3 is a view illustrating a voltage applied to a second connection unit, an output voltage of a comparator, and an operation state of a relay according to situations of the DC uninterruptible power supply system of FIG. 2, which occur according to a state of a DC power conversion system and a load connection state.

FIG. 3 is a view illustrating a voltage applied to the second connection unit 7, an output voltage of the first comparator 33, an output voltage of the second comparator 25, and an operation state of the relay 22 according to situations of the DC uninterruptible power supply system 100 of FIG. 2, which occur according to a state of the DC power conversion system 1 and a load connection state.

Referring to FIG. 3, when the DC power conversion system 1 normally operates to a point in time of t0, that is, when DC power is supplied from the DC power conversion system 1 through the first connection unit 5, the relay 22 maintains the clear state due to the first clear voltage and the second clear voltage output at the same time from the first comparator 33 and the second comparator 25 in such a way that the DC power supplied from the DC power conversion system 1 is supplied to the load 3 through the second connection unit 7 and simultaneously is boosted by the charging portion 23 to charge the auxiliary power supply device 50. Since the auxiliary power supply device 50 performs a charging operation and does not perform a discharge operation, the internal voltage power output from the discharge portion 27 does not occur. When the DC power conversion system 1 normally operates, the DC power supplied from the DC power conversion system 1 is supplied to the load 3 and the auxiliary power supply device 50.

Situation 1 is a situation which occurs from the point in time of t0 to a point in time of t2. When the DC power conversion system 1 is damaged or short-circuits while the load 3 is connected to the second connection unit 7, since the DC power supplied from the DC power conversion system 1 through the first connection unit 5 is gradually reduced and completely cut off at a point in time of t1, the DC power is not supplied any more to the load 3, the second comparator 25, and the auxiliary power supply device 50. Due to this, the second set voltage is allowed to be output from the second comparator 25. From when the DC power is not supplied to the auxiliary power supply device 50, the auxiliary power supply device 50 starts being discharged in such a way that the discharge portion 27 steps down a level, for example, 16.8 V of the power of the auxiliary power supply device 50 and the internal voltage power, for example, 12.3 V obtained by stepping down the same to the current sensor 32, thereby allowing the current sensor 32 to output the first sensor voltage while outputting the internal voltage power as the sense voltage power. Accordingly, the first comparator 33 compares the first sensor voltage with the first reference voltage at a higher level than the first sensor voltage to output the first set voltage. As described above, as the first set voltage is output from the first comparator 33 and simultaneously the second set voltage is output from the second comparator 25, the switchover portion 21 switches the state of the relay 22 into the set state in such a way that the second terminal and the fourth terminal of the relay 22 are connected to allow the sense voltage power output from the current sensor 32 to be supplied to the second connection unit 7. Here, before the relay 22 is completely switched over to the set state, the down voltage power generated from the sense voltage power through the down voltage generation portion 29 is supplied to the second connection unit 7. After the relay 22 is completely switched over to the set state, the sense voltage power is supplied to the second connection unit 7 through the relay 22.

Also, in Situation 2, that is, when a state in which the DC power conversion system 1 is inserted and restored at the point in time of t2 and the DC power is applied from the DC power conversion system 1 while the load 3 is connected continues to a point in time of t3, the first comparator 33 and the second comparator 25 output the first clear voltage and the second clear voltage at the same time and according thereto the relay 22 is switched over into the clear state. When the relay 22 is switched over into the clear state, that is, when a contact point of the relay 22 is changed from connection between the second terminal and the fourth terminal to connection between the second terminal and the third terminal and the relay 22 becomes the clear state, a ripple may occur at an output of the second terminal of the relay 22 but a voltage of the ripple is maintained as 10.8 V or more due to the down voltage power generated from the sensed voltage power output from the current sensor 32 through the down voltage generation portion 29. After that, when the relay 22 is completely switched over into the clear state, the DC power supplied from the DC power conversion system 1 is supplied to the second connection portion 7 and the charging portion 23 through the relay 22. In Situation 3, that is, the damage state of the DC power conversion system 1 and the no-load state in which the load 3 is not connected to the second connection unit 7 continue from the point in time of t3 to a point in time of t4. Here, as the first clear voltage is output form the first comparator 33 and simultaneously the second set voltage is output from the second comparator 25, the switchover portion 21 may prevent the power of the auxiliary power supply device 50 from being discharged by controlling the relay 22 to be the clear state. Here, a case in which the first clear voltage is output from the first comparator 33 and simultaneously the second set voltage is output from the second comparator 25 in the no-load state in which the load 3 is not connected to the second connection unit 7 may occur when the DC power conversion system 1 is damaged while being connected to the first connection unit 5 and the load 3 is not connected to the second connection unit 7.

As is apparent from the above description, a DC uninterruptible power supply system in accordance with one embodiment of the present invention may be connected to a DC power conversion system converting prevailing AC power into DC power, may supply the DC power to a load, may charge an internal auxiliary power supply device with the DC power, and may continuously supply power to the load from the auxiliary power supply device while completely cutting off an electric connection with the DC power conversion system when the DC power conversion system short-circuits or is disconnected due to a leakage current or damage thereof.

Also, since a CPU and a software controller are not included, it is possible to prevent a phenomenon, in which power of an auxiliary power supply device is discharged when a power outage does not occur, the phenomenon which may occur due to a malfunction of the CPU due to electromagnetic waves, a disorder in a hardware configuration of the CPU, and an error in software such as a control program.

Also, since charge and discharge circuits are formed in a DC power state, it is unnecessary to convert AC power into DC power to charge an auxiliary power supply device such as a battery and to convert DC power of the auxiliary power supply device into AC power to supply it to a load, thereby simplifying a circuit configuration of the DC uninterruptible power supply system.

While the present invention has been particularly shown and described with reference to exemplary embodiments thereof, it will be understood by those of ordinary skill in the art that various changes in form and details may be made therein without departing from the spirit and scope of the present invention as defined by the following claims. Accordingly, the scope of the present invention will not be limited to the embodiments described above and it would be understood to include the content disclosed in the claims and equivalents thereof.

What is claimed is:

1. A direct current (DC) uninterruptible power supply system provided with a first connection unit electrically connected to a DC power conversion system which converts prevailing alternating current (AC) power into DC power, an auxiliary power supply device charged with the DC power, and a second connection unit which is electrically connected to a load and supplies the DC power or power output from the auxiliary power supply device to the load, the DC uninterruptible power supply system comprising:
    a charging portion which boosts a level of DC voltage power supplied from the DC power conversion system normally connected to the first connection unit and charges the auxiliary power supply device with the boosted DC voltage power;
    a discharge portion which generates internal voltage power by stepping down a level of voltage power of the auxiliary power supply device;
    a current sensor which outputs sensor voltages at different levels depending on whether current power is applied from the discharge portion;
    a first comparator which compares the levels of the sensor voltages output from the current sensor with a level of a first reference voltage and outputs a first clear voltage or a first set voltage according to a result thereof;
    a second comparator which compares the level of the DC voltage power supplied from the DC power conversion system with a level of a second reference voltage and outputs a second clear voltage or a second set voltage according to a result thereof; and
    a switchover portion which comprises a relay connected to the first connection unit, the second connection unit, and the discharge portion, in which as the first clear voltage and the second clear voltage are output at the same time from the first comparator and the second comparator while the load is connected to the second connection unit, the relay is controlled to be a clear state to allow the DC power supplied from the DC power conversion system to be supplied to the load of the second connection unit and to the auxiliary power supply device through the charging portion and as the first set voltage and the second set voltage are output at the same time from the first comparator and the second comparator, the relay is controlled to be a set state to allow the internal voltage power generated at the discharge portion to be supplied to the second connection unit.

2. The DC uninterruptible power supply system of claim 1, wherein a case in which the first clear voltage and the second clear voltage are output at the same time from the first comparator and the second comparator while the load is connected to the second connection unit occurs when the DC power conversion system is normally connected to the first connection unit in such a way that the DC power supplied from the DC power conversion system is supplied to the load connected to the second connection unit and used to charge the auxiliary power supply device at the same time.

3. The DC uninterruptible power supply system of claim 1, wherein a case in which the first set voltage and the second set voltage are output at the same time from the first comparator and the second comparator while the load is connected to the second connection unit occurs when a disconnection state of the DC power conversion system from the first connection unit, a damage state of the DC power conversion system connected to the first connection unit, or a short circuit state of the DC power conversion system occurs.

4. The DC uninterruptible power supply system of claim 1, wherein the switchover portion, as the first clear voltage is output from the first comparator and simultaneously the second set voltage is output from the second comparator in a no-load state in which the load is not connected to the second connection unit, controls the relay to be the clear state to prevent power of the auxiliary power supply device from being discharged.

5. The DC uninterruptible power supply system of claim 4, wherein a case in which the first clear voltage is output from the first comparator and simultaneously the second set voltage is output from the second comparator in a no-load state in which the load is not connected to the second connection unit occurs when the DC power conversion system is damaged while being connected to the first connection unit.

6. The DC uninterruptible power supply system of claim 3, wherein the disconnection state of the DC power conversion system from the first connection unit is a state in which the DC power conversion system is disconnected from the first connection unit and the DC power normally output from the DC power conversion system is not supplied to the first connection unit.

7. The DC uninterruptible power supply system according to claim 3, wherein the damage state of the DC power conversion system is a state in which the DC power conversion system does not work and the DC power is not normally output.

8. The DC uninterruptible power supply system according to claim 3, wherein the short-circuit state of the DC power conversion system is a state in which an anode and a cathode of the DC power conversion system short-circuit.

9. The DC uninterruptible power supply system of claim 1, wherein the current sensor outputs a first sensor voltage when the current power is applied from the discharge portion and outputs a second sensor voltage at a level higher than that of the first sensor voltage when the current power is not applied from the discharge portion, and wherein the first comparator compares the first sensor voltage with the first reference voltage at the level higher than that of the first sensor voltage to output the first set voltage and compares the second sensor voltage with the first reference voltage at the level lower than that of the second sensor voltage to output the first clear voltage.

10. The DC uninterruptible power supply system of claim 1, wherein the second comparator outputs the second clear voltage when the level of the DC voltage power supplied from the DC power conversion system is higher than that of the second reference voltage and outputs the second set voltage when the level of the DC voltage power supplied from the DC power conversion system is lower than that of the second reference voltage.

11. The DC uninterruptible power supply system of claim 1, wherein the current sensor, as the current power is applied from the discharge portion, outputs the internal voltage power generated at the discharge portion as sense voltage power, the DC uninterruptible power supply system further comprising a down voltage generation portion which generates down voltage power by stepping down a level of the sense voltage power output from the current sensor and applies the down voltage power to the second connection unit, and wherein the down voltage power is supplied to the second connection unit until the switchover portion receives the first set voltage and the second set voltage from the first comparator and the second comparator at the same time in such a way that the state of the relay is completely switched over from the clear state into the set state.

12. The DC uninterruptible power supply system of claim 1, further comprising an auxiliary power supply portion which stabilizes the voltage power of the auxiliary power supply device to be uniform control power and supplies the control power to the first comparator, the second comparator, and the relay.

13. The DC uninterruptible power supply system of claim 1, further comprising a switch which is connected to the auxiliary power supply device and controls connection between the discharge portion and the auxiliary power supply device.

14. The DC uninterruptible power supply system according to claim 5, wherein the damage state of the DC power conversion system is a state in which the DC power conversion system does not work and the DC power is not normally output.

15. The DC uninterruptible power supply system according to claim 5, wherein the short-circuit state of the DC power conversion system is a state in which an anode and a cathode of the DC power conversion system short-circuit.

* * * * *